US009969394B2

(12) United States Patent
Maier

(10) Patent No.: US 9,969,394 B2
(45) Date of Patent: May 15, 2018

(54) DISTANCE REGULATING SYSTEM, MOTOR VEHICLE AND COMPUTER PROGRAM PRODUCT

(71) Applicant: GM GLOBAL TECHNOLOGY OPERATIONS LLC, Detroit, MI (US)

(72) Inventor: Oliver Maier, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days. days.

(21) Appl. No.: 15/131,508

(22) Filed: Apr. 18, 2016

(65) Prior Publication Data
US 2016/0304093 A1 Oct. 20, 2016

(30) Foreign Application Priority Data
Apr. 17, 2015 (DE) .................... 20 2015 002 817 U

(51) Int. Cl.
*B60W 30/16* (2012.01)
*B60W 30/18* (2012.01)
*G01C 21/34* (2006.01)
*B60W 50/00* (2006.01)

(52) U.S. Cl.
CPC ...... *B60W 30/16* (2013.01); *B60W 30/18145* (2013.01); *G01C 21/34* (2013.01); *B60W 2050/008* (2013.01); *B60W 2420/42* (2013.01); *B60W 2520/125* (2013.01); *B60W 2550/146* (2013.01); *B60W 2550/308* (2013.01); *B60W 2720/106* (2013.01); *B60W 2720/125* (2013.01)

(58) Field of Classification Search
None
See application file for complete search history.

(56) References Cited

U.S. PATENT DOCUMENTS 7,729,841 B2 6/2010 Knoop et al.
8,036,804 B2 10/2011 Laiou et al.
8,170,769 B2 5/2012 Tsuchiya et al.
(Continued)

FOREIGN PATENT DOCUMENTS

DE 10242124 A1 3/2004
DE 102005027655 A1 12/2006
(Continued)

OTHER PUBLICATIONS

German Patent Office, German Search Report for German Application No. 202015002817.9, dated Jan. 8, 2016.

*Primary Examiner* — Rami Khatib
*Assistant Examiner* — Gerrad A Foster
(74) *Attorney, Agent, or Firm* — Lorenz & Kopf LLP

(57) ABSTRACT

A distance regulating system is disclosed for the automatic adjusting of a distance of a motor vehicle to a motor vehicle travelling ahead. At least one sensor detects the distance to the motor vehicle travelling ahead. A route detector detects a route section lying ahead. A control unit is equipped in order to transmit acceleration commands to a drive of the motor vehicle, to accelerate with a preset acceleration upon increasing distance to the motor vehicle travelling ahead or during open straight-ahead travel. The control unit can determine a transverse acceleration to be expected and adjust a longitudinal acceleration as a function of the transverse acceleration to be expected when a curve lying ahead is detected by the route detection.

8 Claims, 2 Drawing Sheets

(56) References Cited

U.S. PATENT DOCUMENTS

| | | | |
|---|---|---|---|
| 9,043,115 B2 | 5/2015 | Schuberth et al. | |
| 9,186,988 B2 | 11/2015 | Wimmer et al. | |
| 2010/0198450 A1* | 8/2010 | Shin ..................... | B60W 30/16 701/31.4 |

FOREIGN PATENT DOCUMENTS

| | | |
|---|---|---|
| DE | 102011115138 A1 | 3/2013 |
| DE | 102013006172 A1 | 10/2014 |

\* cited by examiner

DISTANCE REGULATING SYSTEM, MOTOR VEHICLE AND COMPUTER PROGRAM PRODUCT

CROSS-REFERENCE TO RELATED APPLICATION

This application claims priority to German Patent Application No. 202015002817.9, filed Apr. 17, 2015, which is incorporated herein by reference in its entirety.

TECHNICAL FIELD

The present disclosure pertains to a distance regulating system, a motor vehicle and a computer program product. The distance regulating system serves for the automatic adjusting of a distance of a motor vehicle to a motor vehicle travelling ahead.

BACKGROUND

Distance regulating systems of the type mentioned at the outset are generally known. Corresponding distance regulating systems are frequently described also as distance regulating or adaptive cruise controls. Known systems measure the distance to a motor vehicle travelling ahead and keep a motor vehicle equipped with such at a certain distance to the former. The distance can depend on the speed. When the vehicle travelling ahead speeds away and the distance between the two motor vehicles increases because of this, the distance regulating system accelerates the motor vehicle with a preset acceleration. The acceleration is maintained until a preset speed is reached.

DE 10 2005 027 655 A1 describes a driver assistance system with an interface to a navigation system. The drive assistance system is an autonomous cruise control (ACC) system which is designed in order to adjust the own motor vehicle in longitudinal direction upon disappearance of a reference vehicle travelling ahead so that the speed of the motor vehicle is suitably adapted to the upcoming route. The ACC system in this case receives information regarding the route in particular the elevation profile from the navigation system of the motor vehicle.

Disadvantageous in the known methods is that these are optimized to straight roads with respect to the selected longitudinal acceleration. On winding routes, the longitudinal acceleration of the motor vehicle in conjunction with the transverse acceleration can result in high total accelerations.

SUMMARY

An aspect of the present disclosure provides distance regulating systems of the type mentioned so that these are better suitable for travelling on winding roads. A distance regulating system described in the following serves for the automatic adjusting of a distance of a motor vehicle to a motor vehicle travelling ahead. The distance regulating system is equipped in order to keep the distance to the motor vehicle travelling ahead substantially constant. Certain tolerance ranges, which the distance to the motor vehicle travelling ahead may have, can be defined here. It is possible, furthermore, that the distance to be maintained depends on different criteria, among them on the speed, on a travelling mode (for example comfort or sport), on driver settings or on the acceleration of the motor vehicle travelling ahead.

For measuring the distance to the motor vehicle travelling ahead, sensors are provided. Suitable sensors can be optical sensors, radar sensors, lidar sensors or other sensor technologies such as ultrasound or the like. A corresponding sensor system is usually arranged in the front region of a motor vehicle. Instead of an individual sensor, a plurality of sensors can also be installed, for example multiple optical sensors which can generate a stereo image. Different sensor types can also be combined with one another and the sensor information of the sensors balanced with one another.

Furthermore, a control unit is provided which evaluates the information of the at least one sensor. The control unit can thus determine if another motor vehicle is travelling in front of the motor vehicle and if yes if the distance corresponds to a set distance. If the actual distance to the motor vehicle travelling ahead is too low, acceleration, depending on the situation, for example the relative speed of the two motor vehicles, acceleration can be reduced or under certain conditions even a brake intervention initiated.

The control unit is equipped, furthermore, to transmit acceleration commands to a drive of the motor vehicle. Through the drive intervention of the distance regulating system, the output power of the drive can be influenced. Suitable acceleration commands however can also be negative as already mentioned before and be brought about either by reducing the drive power or through brake intervention.

The control unit is equipped, furthermore, to accelerate with a preset acceleration in the case of an increasing distance to the motor vehicle travelling ahead or in the case of open straight ahead travelling. In this way, it is possible to catch up again with the motor vehicle travelling ahead. The acceleration can be maintained up to the reaching of a preset speed. The acceleration need not be constant over the entire speed range but can depend on the speed. The acceleration can inevitably decrease, for example through power and torque of the motor vehicle. However, different acceleration-speed curves can also be implemented. These can additionally may depend on the selected driving mode.

Furthermore, a route detection is provided which detects a route section lying in front of the motor vehicle. The control unit is equipped to determine an expected transverse acceleration in the case of a curve lying ahead that is detected by the route detection and adjust a longitudinal acceleration as a function of the expected transverse acceleration. Thus, the acceleration commands communicated to the drive become dependent on the course of the road. By taking into account the transverse acceleration to be expected, the longitudinal acceleration can be adapted so that the transverse acceleration does not become too high. An unsettled feeling of the driver resulting from too high a transverse acceleration with incorrect behavior possibly resulting from this can thereby be avoided. Furthermore, the safety in travelling mode can be increased at physical level since because of this dangerous curve speeds can be avoided.

According to a further development, the control unit can be designed in such a manner that the corresponding longitudinal acceleration is reduced even before the start of the curve so that the entry speed of the motor vehicle in the curve already takes into account the transverse acceleration to be expected. Furthermore, the control unit can be equipped in order to prevent a longitudinal acceleration through the drive of the motor vehicle in the curve.

A first possible further configuration of the distance regulating system provides that the route detection includes a camera wherein the control unit is equipped in order to determine a route from images of the camera. Such a camera can be a stereo image camera. The route detection can alternatively or additionally include further input sources, for example a navigation system. Camera and navigation system can interact for example in order to carry out a plausibility check of the evaluation. Furthermore, the curve radius for example can be known by way of the navigation system, but the start of the relevant curve be determined with the help of the camera image.

Another further configuration of the distance regulating system provides that the control unit is equipped in order to adjust the longitudinal acceleration in such a manner that it corresponds to a preset acceleration reduced as a function of the transverse acceleration to be expected. Thus, the longitudinal acceleration can be adapted relative to the selected preset acceleration which in turn can depend on the driving mode.

In a further configuration going beyond that, the control unit can be equipped in order to achieve a constant total acceleration. This can be effected on the one hand in that the longitudinal acceleration and the transverse acceleration summed using vector addition to determine an total acceleration and at the entry in the curve the longitudinal acceleration is suitably reduced or in that upon commencement of the transverse acceleration, that is upon turning into the curve, the longitudinal acceleration is reduced to zero, but beforehand corresponded to the transverse acceleration or to a corresponding factor of the transverse acceleration. Because of this, the occupants of a motor vehicle regulated accordingly sense a constant acceleration which is perceived as a steady drive.

A further configuration of the distance regulating system provides that the control unit is equipped in order to use a circle of forces model. A circle of forces is a graphic representation for distributing the possible total force on a wheel of a motor vehicle into a cornering force in transverse direction and a driving force in longitudinal direction pending the reaching of a maximum friction force. In this way it can be ensured that the corresponding accelerations do not exceed a preset proportion of the maximum friction values. The proportion can be selected so that different tire conditions and different road conditions are taken into account and among other things depend on the driving conditions, for example on the condition of the road.

According to a further configuration, the distance regulating system can be equipped in order to accelerate up to a preset speed.

Another aspect relates to a motor vehicle with a distance regulating system of the aforementioned type. A corresponding motor vehicle can be driven particularly comfortably and safely in a distance regulating mode. Yet another aspect relates to a computer program product with a computer-readable storage medium on which commands are embedded which when these are executed by a computer unit enable a distance regulating system in such a manner that acceleration commands are transmittable to a drive of a motor vehicle, wherein with increasing distance to a motor vehicle travelling ahead and open straight ahead travel a preset acceleration is preset. When a curve lying ahead is detected, the transverse acceleration to be expected can be determined and a longitudinal acceleration preset as a function of the transverse acceleration to be expected.

In a first further configuration of the computer program product, the commands can be equipped in order to calculate the longitudinal acceleration on the basis of a circle of forces model.

An additional aspect elates to a method for operating a motor vehicle by means of the distance regulating system. The distance regulating system detects a distance to a motor vehicle travelling ahead and transmits acceleration commands to a drive of the motor vehicle as a function of the distance to the motor vehicle travelling ahead. With increasing distance to the motor vehicle travelling ahead it is provided that travelling acceleration is performed with a preset acceleration in the case of open straight ahead. The preset acceleration can depend on an operating mode of the motor vehicle. It is provided, furthermore, that a route section lying in front of the motor vehicle is detected and analyzed. In the case of a curve lying ahead, a transverse acceleration to be expected is determined and a longitudinal acceleration adjusted as a function of the transverse acceleration to be expected. In this way, the longitudinal acceleration can be adapted to the transverse acceleration to be expected, as a result of which a particularly homogeneous driving can be made possible.

A further configuration of the method provides that the route detection takes place by evaluating images of a sensor such as a camera. Alternatively or additionally to this, further input sources can be used for the route detection, for example a navigation system, from which road map data are used in order to determine the course of the route lying ahead.

A further configuration of the method provides that the longitudinal acceleration is adjusted in such a manner that it corresponds to a preset acceleration which is reduced as a function of the transverse acceleration to be expected in the curve lying ahead.

A further configuration of the method provides that the longitudinal acceleration is selected in such a manner that a constant total acceleration, that is the sum of longitudinal acceleration and transverse acceleration is reached. The total acceleration can be constant before and while travelling through the curve.

In a further configuration it can be provided that for adapting the longitudinal acceleration a circle of forces model is used.

Furthermore, the acceleration can take place up to a given speed. The given speed can be determined by a driver. The given speed can have a lower limit which prevents the distance regulating system from being activated for example in a pedestrian zone. Furthermore, a certain maximum speed can be permitted in order to prevent that the distance regulating system is used at speeds that are too high.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
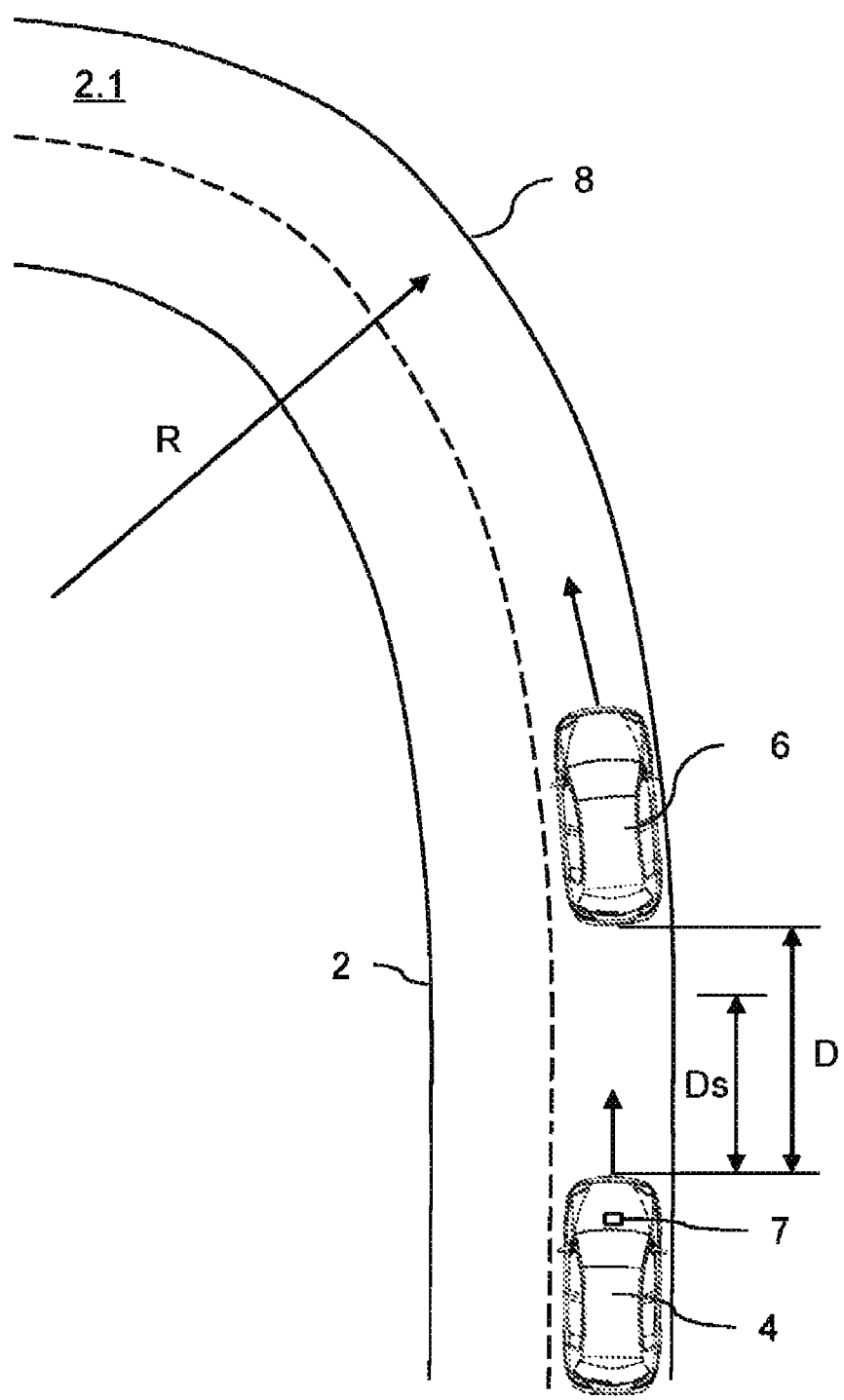
FIG. 1 shows a top view of a country road with a motor vehicle.

FIG. 1 shows a country road 2 on which a motor vehicle 4 is travelling. In front of the motor vehicle 4, a motor vehicle 6 is travelling ahead of motor vehicle 4. The motor vehicle 6 travelling ahead accelerates and becomes faster than the motor vehicle 4, which is represented by the corresponding arrows of different length on the motor vehicles 4, 6. An increasing distance D between the motor vehicles 4, 6 materializes, which is greater than a set distance $D_s$, which is to be maintained by a distance regulating system 7 of the motor vehicle 4.

On the road 2 a curve 8 is lying ahead. The curve 8 has a curve radius R which in this case is measured from a curve center to a middle of a lane 2, 1. The distance regulating system 7 of the motor vehicle 4, which will be explained in more detail in FIG. 2, includes a route detection with the help of which the course of the road 2 can be determined. This detection can take place continuously. With the help of the route detection it is determined that a curve 8 is near.

Figure 2:
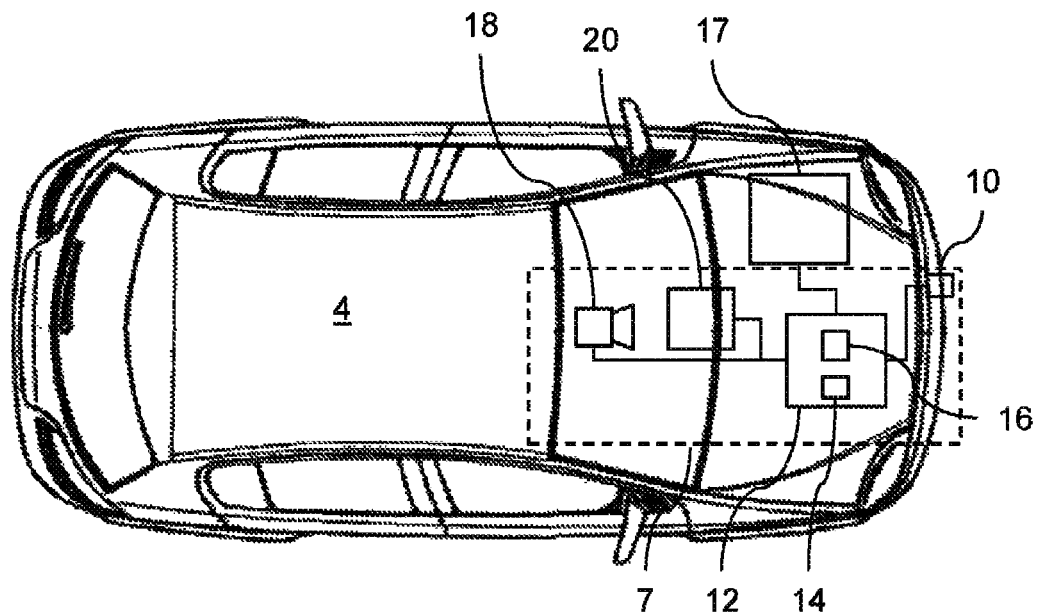
FIG. 2 shows a top view of a motor vehicle with a distance regulating system.

Through the increasing distance to the motor vehicle 6 travelling ahead the distance regulating system 7 of the motor vehicle 4 which is described in more detail in FIG. 2 registers that the motor vehicle 4 can be accelerated until a preset speed which can be preset by the driver of the motor vehicle 4 is reached. The preset speed can also correspond to a maximum permissible speed on the route 2 or be limited by the same.

The distance regulating system 7 accelerates the motor vehicle 4 on straight, open route with a preset acceleration.

By detecting the curve 8 lying ahead, it is determined by the motor vehicle 4 as a function of the detected curve radius R that a transverse acceleration will be incurred in the curve 8. The transverse acceleration of the motor vehicle 4 in the curve 8 will depend on the speed of the motor vehicle 4. The calculation of this speed is solvable and depends on the acceleration of the motor vehicle 4 and the distance up to the curve 8.

The acceleration of the motor vehicle 4 can now be adjusted in such a manner that the longitudinal acceleration of the motor vehicle 4 combined with the transverse acceleration of the motor vehicle 4 in the curve is constant. This can be effected among other things in that in the curve 8 a longitudinal acceleration of the motor vehicle 4 is suitably reduced. The reduction of the longitudinal acceleration can go down as far as to zero. For calculating the acceleration, a circle of forces may be used, as is shown and explained in FIG. 3.

FIG. 2 shows a top view of the motor vehicle 4. The distance regulating system 7 (framed in dashed line) of the motor vehicle 4 includes a distance radar 10 which in travelling direction is orientated towards the front. The distance radar 10 is connected to a control unit 12. The control unit 12 includes a computing unit 14 and a storage unit 16. In the storage unit 16, a computer program product is stored which, when it is loaded into the computing unit 14 and executed by the same, controls the distance regulating system 7. The distance regulating system 7 acts on a drive 17 of the motor vehicle which can include a drive motor and a brake.

Furthermore, a camera 18 is provided. The camera 18 is likewise connected to the control unit 12 and serves for detecting the route lying ahead. In some configurations, a navigation system 20 is provided furthermore, in which a roadmap is stored.

The control unit 12 can evaluate the information of the camera 18 and if appropriate the information of the navigation system 20 and thus determine where a curve is to be expected and which radius R this curve has. Because of this, a prediction regarding the transverse acceleration of the motor vehicle 4 to be expected can be made. This can, as described earlier, be used for adapting a longitudinal acceleration with activated distance regulating system 7.

Figure 3:
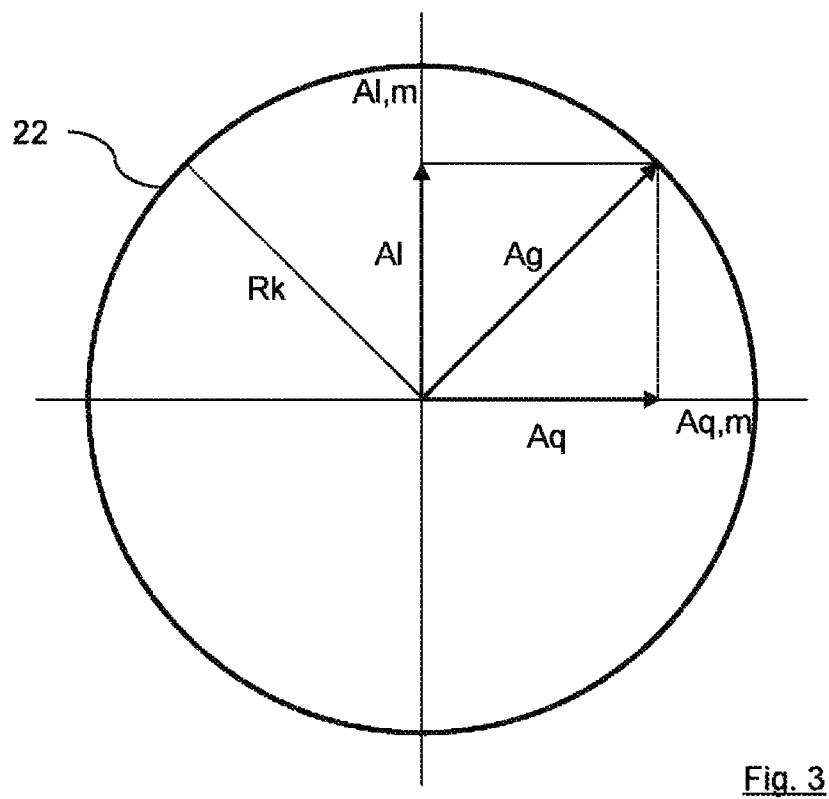
FIG. 3 represents a circle of forces.

FIG. 3 shows a model of a circle of forces 22. In the circle of forces, longitudinal accelerations $A_l$ and transverse accelerations $A_q$ up to the reaching of a total acceleration $A_g$ are shown. Longitudinal acceleration $A_l$ and transverse acceleration $A_q$ are perpendicular to one another, and the total acceleration is the vector sum of the longitudinal and transverse acceleration.

A radius $R_k$ of the circle of forces 22 corresponds to the maximum possible acceleration transmittable by a tire. The radius $R_k$ of the circle of forces 22 thus depends on the tire type, tire condition and on other criteria, for example a chassis of the motor vehicle, a weight of the motor vehicle and the like.

The corresponding model is idealized. Some circle of forces models correspond to an ellipse, in the case of which transverse accelerations are possibly lower than longitudinal accelerations. The vector addition of longitudinal accelerations and transverse accelerations must then not be greater than the ellipse.

The circle of forces 22 states that the maximum possible total acceleration $A_g$ can vectorially not be greater than the vector addition of longitudinal acceleration $A_l$ and transverse acceleration $A_q$. The greater the transverse acceleration $A_q$, the lower can the longitudinal acceleration $A_l$ will be. With maximum transverse acceleration $A_{q,m}$, no longitudinal acceleration at all is possible any longer without exceeding the adhesion limit of the relevant tire. Upon maximum longitudinal acceleration $A_{l,m}$, no transverse forces can be absorbed by the tire. The described distance regulating system 7 can select a radius $R_k$ for the circle of forces 22 which is selected smaller than preset by the adhesion limit of a corresponding tire, in order to maintain a safety buffer.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A distance regulating system for automatically adjusting a distance of an own vehicle to another vehicle travelling ahead of the own vehicle, the distance regulating system comprising:

at least one sensor for detecting the distance to the other motor vehicle travelling ahead;
  a route detection system for determining a route section that is lying ahead of the own vehicle; and
  a control unit configured to communicate an acceleration command to a drive of the own vehicle;
  wherein the acceleration command corresponds to a preset acceleration for accelerating the own vehicle with the preset acceleration up to a preset speed when the distance to the other vehicle is greater than a set distance;
  wherein when the route section is straight, the preset acceleration is based on a longitudinal acceleration where the longitudinal acceleration is directed in a longitudinal direction of the own vehicle;

wherein when the route section includes a curve that is detected lying ahead of the own vehicle, a transverse acceleration is determined where the transverse acceleration is expected to result from the curve, and the acceleration command is based on the longitudinal acceleration as a function of the transverse acceleration;

wherein when the preset speed is not achieved prior to entering the curve, a total acceleration of the own vehicle, when reducing the distance to the set distance, is constant both when the route section is straight and when the route section includes the curve by reducing the longitudinal acceleration to account for the transverse acceleration when the route section includes the curve, where the total acceleration is the longitudinal acceleration when the route section is straight and the total acceleration is a vector sum of the longitudinal acceleration and the transverse acceleration when the route section includes the curve.

2. The distance regulating system according to claim 1, wherein the route detection system comprises a camera for capture a road image, and the control unit is configured to determine the route section from the road image.

3. The distance regulating system according to claim 1, wherein the control unit is configured to adjust the longitudinal acceleration in such a manner that upon commencement of the transverse acceleration, the longitudinal acceleration is reduced to zero.

4. The distance regulating system according to claim 1, wherein the control unit is configured to use a circle of forces model for adapting the longitudinal acceleration when the own vehicle enters the curve, wherein the circle of forces model is based on the total acceleration equaling a vector addition of the longitudinal acceleration and the transverse acceleration for a determined radius of the curve.

5. The distance regulating system according to claim 1, wherein the preset speed corresponds to a maximum permissible speed on the route.

6. A computer program product with a non-transitory computer-readable storage medium having commands embedded therein which when executed by a control unit comprises:
a distance regulating system for communicating acceleration commands transmittable to a drive of a motor vehicle;
wherein the acceleration command is based on a preset acceleration for accelerating the own vehicle with the preset acceleration when the distance to the other vehicle is greater than a set distance and the route section is straight; and
wherein a transverse acceleration is determined when the route section includes a curve that is lying ahead and the acceleration command is based on the longitudinal acceleration as a function of the transverse acceleration, wherein when accelerating the own vehicle to reduce the distance to the set distance, the distance regulating system maintains a total acceleration of the own vehicle as constant from when the route section is straight to when the route section is curved, wherein the total acceleration includes the longitudinal acceleration and the transverse acceleration.

7. The computer program product according to claim 6, wherein the distance regulating system is configured to use a circle of forces model for adapting the longitudinal acceleration, when the own vehicle enters the curve, wherein the circle of forces model is based on the total acceleration equaling a vector addition of the longitudinal acceleration and the transverse acceleration for a determined radius of the curve.

8. A distance regulating system for automatically adjusting a distance of an own vehicle to another vehicle travelling ahead of the own vehicle on a route, the distance regulating system comprising:
at least one sensor for detecting a sensed distance from the own vehicle to the other motor vehicle travelling ahead;
a route detection system for determining whether the route section lying ahead of the own vehicle is straight or includes a curve;
a drive of the own vehicle operated to maintain a set distance from the own vehicle to the other motor vehicle travelling ahead; and
a control unit configured to communicate an acceleration command to the drive;
wherein, when the route detection system determines the route section is straight and the sensed distance detected by the at least one sensor is greater than the set distance, the acceleration command is based on a preset acceleration for accelerating the own vehicle toward a preset speed to adjust the sensed distance to the set distance;
wherein when the route detection system determines the route section includes a curve, a radius of the curve is determined by the control unit, and when accelerating the own vehicle to adjust the sensed distance to the set distance as the own vehicle is entering the curve, and when the preset speed is not achieved prior to entering the curve the acceleration command is adapted to the radius of the curve, wherein a transverse acceleration of the own vehicle for the radius is determined by the control unit, and a total acceleration of the own vehicle is maintained constant by the control unit both before and while the own vehicle travels through the curve, by decreasing the longitudinal acceleration to account for the transverse acceleration when the own vehicle enters the curve.

* * * * *